United States Patent [19]

Fields

[11] 4,319,607
[45] Mar. 16, 1982

[54] VALVE ASSEMBLY AND VALVE SEALING ELEMENT

[75] Inventor: Larry D. Fields, Myra Loma, Calif.

[73] Assignee: Yardney Electric Corporation, Pawcatuck, Conn.

[21] Appl. No.: 106,812

[22] Filed: Dec. 26, 1979

[51] Int. Cl.³ ............................................. F16K 11/04
[52] U.S. Cl. .................................. 137/625.5; 251/358
[58] Field of Search .............. 137/625.5, 625.63, 627.5

[56] References Cited

U.S. PATENT DOCUMENTS

| | | | |
|---|---|---|---|
| 2,640,494 | 6/1953 | Kounovsky | 137/625.5 X |
| 2,897,836 | 8/1959 | Peters et al. | 137/625.5 X |
| 2,935,092 | 5/1960 | Stoner | 137/625.5 |
| 3,779,280 | 12/1973 | Evans et al. | 137/625.5 |
| 3,974,861 | 8/1976 | Hashiguchi et al. | 137/627.5 |

FOREIGN PATENT DOCUMENTS 1229162  4/1971  United Kingdom ............ 137/625.5

*Primary Examiner*—Arnold Rosenthal
*Attorney, Agent, or Firm*—Donald E. Nist

[57] ABSTRACT

The improved valve assembly comprises, in combination, a housing having an elongated central passageway and a plurality of spaced ports in the sidewall thereof along the length thereof in communication with the passageway, an elongated drive shaft disposed in the passageway and movable between a resting position and an actuated position, first biasing means biasing the shaft into the resting position, a plurality of valve openings along the length of the passageway and providing communication between adjacent ones of said ports, a plurality of free floating valve sealing elements disposed transversely on, secured to and spaced along the shaft in the housing, each said element being disposed between two adjacent valve openings, second biasing means in the housing around the shaft biasing the valve elements apart on the shaft, and actuator means connected to the housing for hydraulic pressure movement of the shaft between the resting position wherein a first spaced set of the valve openings is closed by the valve sealing elements and the actuated position wherein a separate second spaced set of the valve openings is closed by the valve sealing elements. The biasing means may be coil springs and each valve sealing element may be a disc bearing valve sealing surfaces on opposite sides thereof.

3 Claims, 4 Drawing Figures

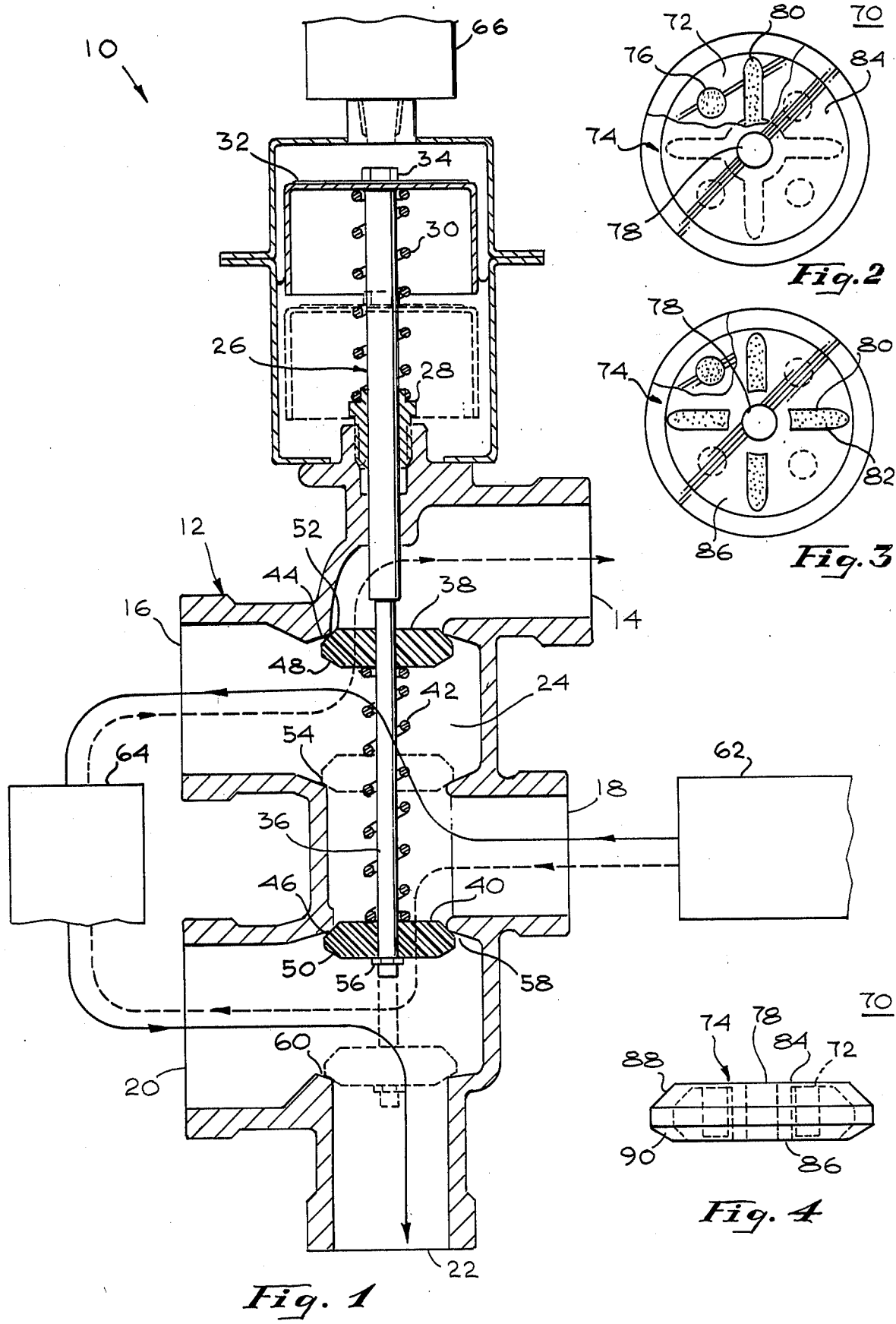

4,319,607

VALVE ASSEMBLY AND VALVE SEALING ELEMENT

BACKGROUND OF THE INVENTION

1. Field of the Invention

The present invention generally relates to valves and more particularly to a valve having a plurality of ports and valve openings, and an improved valve sealing element.

2. Prior Art

In conventional valves such as are used in water filtration systems and the like, economy and durability are important. Certain of such valves employ a plurality of valve openings, and a plurality of valve sealing elements are moved into and out of sealing engagement with the valve openings by means of a number of valve operator rods or the like. Conventional valve sealing elements utilized for such purposes are frequently required to be dimensioned to close tolerances to assure proper closing of the valve openings. However, close tolerance control during production increases the cost of the valves, in many cases to a substantial extent. It would be desirable to be able to provide an improved valve utilizing valve sealing elements which can be dimensioned to larger dimensional tolerances while still performing satisfactorily. It would also be desirable if such valve sealing elements could provide gradual rather than abrupt closing and opening of the valve openings for smoother operation of the valve with less wear. Other structural changes in the valve which would reduce the cost of the valve would also be desirable.

SUMMARY OF THE INVENTION

The improved valve assembly and the improved valve sealing element of the present invention satisfy the foregoing needs. The assembly and element are substantially as set forth in the Abstract above. The valve employs a single longitudinally extending operator rod, shaft or valve stem upon which are disposed a plurality of valve sealing elements in free floating spaced relation. The sealing elements have sloped surfaces on opposite sides which engage the valve openings to smoothly and gradually close and open the same. The elements each include a core of a preferably plastic reinforcing component having a number of apertures in it around which is molded a plastic enclosure fully encapsulating the core, extending through the apertures and bonded to the core. The enclosure has the described sloped valve opening-engaging surfaces. Preferably, the core is of a hard resilient plastic such as nylon or teflon and the enclosure therearound is of a plastic such as polyurethane which has a hardness at least about 50% less than that of the core. The element is structurally stable, very inexpensive to make and efficient. Various other features are set forth in the following description and accompanying drawings.

DRAWINGS

FIG. 1 is a schematic side elevation, partly broken away, of a preferred embodiment of the improved valve assembly of the present invention;

FIG. 2 is a schematic top plan view, partly broken away, of a preferred embodiment of the improved valve sealing element utilized in the valve of FIG. 1;

FIG. 3 is a schematic bottom plan view, partly broken away, of the valve sealing element of FIG. 2; and, FIG. 4 is a schematic side elevation of the valve sealing element of FIG. 2.

DETAILED DESCRIPTION

FIG. 1

FIG. 1 of the drawings schematically depicts a preferred embodiment of the improved valve assembly of the present invention. Thus, assembly 10 comprises, in combination, an elongated housing 12 defining four spaced ports 12, 16, 18 and 20 in the sidewall thereof and port 22 at the downstream end thereof. Each of these ports is in communication with an elongated central passageway 24 running the length of housing 12 and defined thereby. Assembly 10 also includes an elongated single drive shaft 26 disposed longitudinally in passageway 24 and held in proper alignment therein by a fitting 28 secured to housing 12. A coil spring 30 is disposed around shaft 26 between the upper end of fitting 28 and the under surface of a cup shaped plunger 32. Plunger 32 is held on the upper end of shaft 26, as by a nut 34.

The lower portion 36 of shaft 26 is narrowed in diameter and slideably receives thereon a pair of transversely extending disc shaped valve sealing elements 38 and 40. Elements 38 and 40 are kept spaced apart by a coil spring 42 disposed between those elements and around portion 36. Elements 38 and 40 contain upwardly and inwardly sloped peripheral bearing surfaces 44 and 46, respectively, and downwardly and inwardly sloped peripheral bearing surfaces 48 and 50, respectively, spaced from surfaces 44 and 46.

Element 38 is disposed below a valve opening 52 in passageway 24 formed by housing 12 and communicating with ports 14 and 16, as shown in FIG. 1. Element 38 is immediately above valve opening 54 in passageway 24 which opening communicates directly with ports 18 and 16, again as shown in FIG. 1. Element 40 is disposed on the lower end of portion 36 of shaft 26 and prevented from falling from shaft 26, as by an end nut 56. Element 38 is prevented from passing upwardly beyond the upper end of portion 36 due to the difference in diameter of that portion and the remainder of shaft 26. Element 40 is disposed below valve opening 58 in passageway 24 which communicates directly with ports 18 and 20 and above valve opening 60 which communicates directly with port 20 and end port 22 in passageway 24.

Elements 38 and 40, particularly the sloped surfaces 44, 46, 48 and 50 thereof, are dimensioned relative to openings 52, 54, 58 and 60 so that when shaft 26 is in its relaxed position, as shown in FIG. 1 in solid outline, surface 44 seals opening 52 and surface 46 seals opening 58, openings 54 and 60 being open. Accordingly, a fluid such as water passing from a source 62 into assembly 10 through port 18 will therefore pass up through valve opening 54, out port 16 and into, for example, a filtration unit 64, then out of that unit and back into assembly 10 through port 20, whereupon it will pass through opening 60 and out of assembly 10 through port 22 to a desired location, all as shown by the solid arrowed line in FIG. 1. When it is desired to backwash filtration unit 64 to clean it, the flow of water through that unit can be easily reversed merely by moving shaft 26 and the assorted elements 38 and 40 down into the positions indicated in dotted outline in FIG. 1. Thus, shaft 21 can be moved against the biasing action of spring 30, such as by an actuator 66 which is attached to the top of housing 12 and can be made to exert fluid pressure down on plunger 32, causing it to carry shaft 26 into the indicated position in dotted outline in FIG. 1. Actuator 66 may include any suitable fluid pressure exerting means, for example, such as a water pump with a three-way solenoid-actuated valve system. In the position shown in dotted outline elements 38 and 40 block valve openings 54 and 60, respectively, by means of sealing engagement with lower sloped surfaces 48 and 50, respectively. In this position, water from source 62 passes, as shown by the dotted arrowline in FIG. 1, into assembly 10 through port 18, down through opening 58 and out of port 20, and through filtration unit 64 in a direction opposite from that described above, so as to backwash that unit, whereupon the backwash water flows back into assembly 10 through port 16, up through valve opening 52 and out of assembly 10 through port 14 to a waste collection point or the like (not shown).

Although assembly 10 has been illustrated and described in connection with a specific water filtration and backwashing cycle, obviously it can be adapted for use in other modes. It will be understood that once the fluid pressure exerted by actuator 66 is removed, spring 30 will carry shaft 26 back into the relaxed position illustrated in FIG. 1. Thus, a single shaft is utilized to actuate the sealing and opening of a plurality of valve openings by means of a plurality of spaced, free floating valve sealing elements. No critical tolerance need be provided for the valve openings or valve sealing elements since the spring action between the elements cooperates with the tapered sealing surfaces thereof so as to assure that these elements will fit snugly into the valve openings to properly seal them as needed. Each valve element is capable of sealing two spaced valve openings through the use of two separate sloped sealing surfaces. Assembly 10 is simple, durable and inexpensive to fabricate, utilize and repair. It is highly efficient and capable of a variety of modes of operation.

FIGS. 2–4

A preferred embodiment of the valve sealing element utilizable in the assembly of the present invention is schematically depicted in FIGS. 2, 3 and 4. Thus, valve sealing element 70 is shown which comprises a central core consisting of a reinforcing component 72, preferably of a high density, structurally strong plastic, such as nylon, polytetrafluorourethane or the like which is encapsulated in a plastic enclosure 74 and is bonded thereto. Component 72 includes a plurality of apertures 76 through which the plastic material of enclosure 74 extends to aid the bonding. That material preferably is a plastic which is at least about 50% softer than the plastic of component 72. For such purposes it is desirable that the plastic of enclosure 74 be polyurethane. Other plastics, however, can be used. Component 72 also includes an opening 78 extending vertically therethrough at the center thereof so that element 70 can be slideably received over, for example, portion 36 of shaft 26. Preferably, component 72 also includes reinforcing ribs 80 radiating from opening 78. Component 72 is disc shaped as is element 70. Portions 82 of ribs 80 may extend into and through enclosure 74 to aid in bonding and stabilizing component 72 relative to enclosure 74. Enclosure 74 includes parallel top 84 and bottom 86, upwardly and inwardly sloping peripheral surface 88 and downwardly and inwardly sloping peripheral surface 90 spaced therefrom. Surfaces 88 and 90 act as valve opening sealing surfaces in the manner described for surfaces 44, 46, 48 and 50. Element 70 is light in weight, can be made very inexpensively by molding enclosure 74 around previously formed component 72 and is rigid and efficient.

Various modifications, changes, alterations and additions can be made in the improved valve assembly of the present invention and in the improved valve sealing element of the present invention, their components and parameters. All such modifications, changes, alterations and additions as are within the scope of the appended claims form part of the present invention.

What is claimed is:

1. An improved continuous flow, reversible flow direction valve assembly, said assembly comprising, in combination:
   (a) an elongated housing defining an elongated central passageway and having a plurality of separate spaced ports in the sidewall thereof along the length thereof in communication with said passageway;
   (b) an elongated drive shaft disposed longitudinally in said passageway and movable between a resting position and an actuated position;
   (c) first coil springs around said shaft in said housing biasing said shaft into said resting position;
   (d) a plurality of valve openings defined by said housing along the length of said passageway, said valve openings providing communication between adjacent ones of said ports;
   (e) a plurality of free floating valve sealing elements disposed transversely on, secured to and spaced along said shaft in said housing, each said valve sealing element being disposed between two adjacent ones of said valve opening and including two peripheral annular valve sealing surfaces on opposite sides thereof, said shaft including detents to limit the longitudinal movement of said valve sealing elements on said shaft;
   (f) second coiled springs in said housing around said shaft biasing said valve sealing elements apart on said shaft;
   (g) actuator means connected to said housing for movement of said shaft between said resting position wherein a first spaced set of said valve openings is closed by said valve sealing elements and a second set of said valve openings is open for fluid flow through said valve in a first direction, and said actuated position wherein said second separate spaced set of said valve openings is closed by said valve sealing elements and said first set of valve openings is open for fluid flow through said valve in a second direction.

2. The improved valve assembly of claim 1 wherein said housing defines 4 side ports and 1 end port downstream thereof, wherein 4 valve openings are disposed in said housing and wherein a pair of said discs is disposed on said shaft.

3. The improved valve assembly of claim 2 wherein said actuator comprises a three-way solenoid-controlled valve providing fluid pressure to move said shaft longitudinally of said housing against said first biasing spring.

* * * * *